(12) United States Patent
Smith et al.

(10) Patent No.: US 6,594,673 B1
(45) Date of Patent: Jul. 15, 2003

(54) VISUALIZATIONS FOR COLLABORATIVE INFORMATION

(75) Inventors: Marc A. Smith, Redmond, WA (US); Steven M. Drucker, Bellevue, WA (US); Rebecca Xiong, Cambridge, MA (US)

(73) Assignee: Microsoft Corporation, Redmond, WA (US)

(*) Notice: Subject to any disclaimer, the term of this patent is extended or adjusted under 35 U.S.C. 154(b) by 0 days.

(21) Appl. No.: 09/391,914

(22) Filed: Sep. 9, 1999

Related U.S. Application Data

(60) Provisional application No. 60/100,420, filed on Sep. 15, 1998.

(51) Int. Cl.$^7$ .............................................. G06F 17/30
(52) U.S. Cl. ........................................ 707/104.1; 707/2
(58) Field of Search .................................. 707/104.1, 2

(56) References Cited

U.S. PATENT DOCUMENTS

| | | | | |
|---|---|---|---|---|
| 5,796,393 A | * | 8/1998 | MacNaughton et al. | 345/733 |
| 6,215,495 B1 | * | 4/2001 | Grantham et al. | 345/419 |
| 6,266,805 B1 | * | 7/2001 | Nwana et al. | 717/4 |
| 6,289,299 B1 | * | 9/2001 | Daniel, Jr. et al. | 703/21 |
| 6,295,514 B1 | * | 9/2001 | Agrafiotis et al. | 703/12 |

OTHER PUBLICATIONS

Donath, J. "Visual Who: Animating the affinites and activities of an electronic community" ACM Multimedia 95, Nov. 5–12, 1995, San Francisco, CA.

Krebs, V. "Visualizing Human Networks" Release 1.0, Feb. 12, 1996.

Resnick, P. et al. "An Open Architecture for Collaborative Filtering ofNetnews," Proc. of CSCW '94, Conference on Computer Supported Cooperative Work (Chapel Hill, NC, 1994),Addison–Wesley (received).

Terveen, L. et al. "Finding and Visualizing Inter–Site Clan Graphs," CHI'98.

"KrackPlot: a social visualization program," www.heinz.cmu.edu/~krack/ Mar. 6, 1999.

Netscan: "Measuring and Mapping the Social Structure of Usenet," Presented at 17$^{th}$ Annual International Sunbelt Social Network Conference, San Diego, CA, Feb. 13–16, 1997.

* cited by examiner

*Primary Examiner*—Wayne Amsbury
(74) *Attorney, Agent, or Firm*—Ipsolon LLP

(57) ABSTRACT

An interactive collaborative information visualization system provides improved visualizations of relationships or connections in collaborative information relating to network interaction media such as email and email lists, conferencing systems and bulletin boards, chats, multi-user dungeons (MUDs), multi-user games and graphical virtual worlds, etc. In one implementation, network graphs in various display or visualization formats represent the collaborative information as nodes that are connected together by links. With reference to collaborative information about Usenet newsgroups, one visualization format provides an inter-group visualization in which newsgroup nodes are linked together by links representing messages that are cross-posted between the newsgroups. Other visualization format can be provided. In one implementation, a graphical user interface allows a user to control the database filter to select the selected portion of the collaborative information to be obtained and measured.

32 Claims, 8 Drawing Sheets

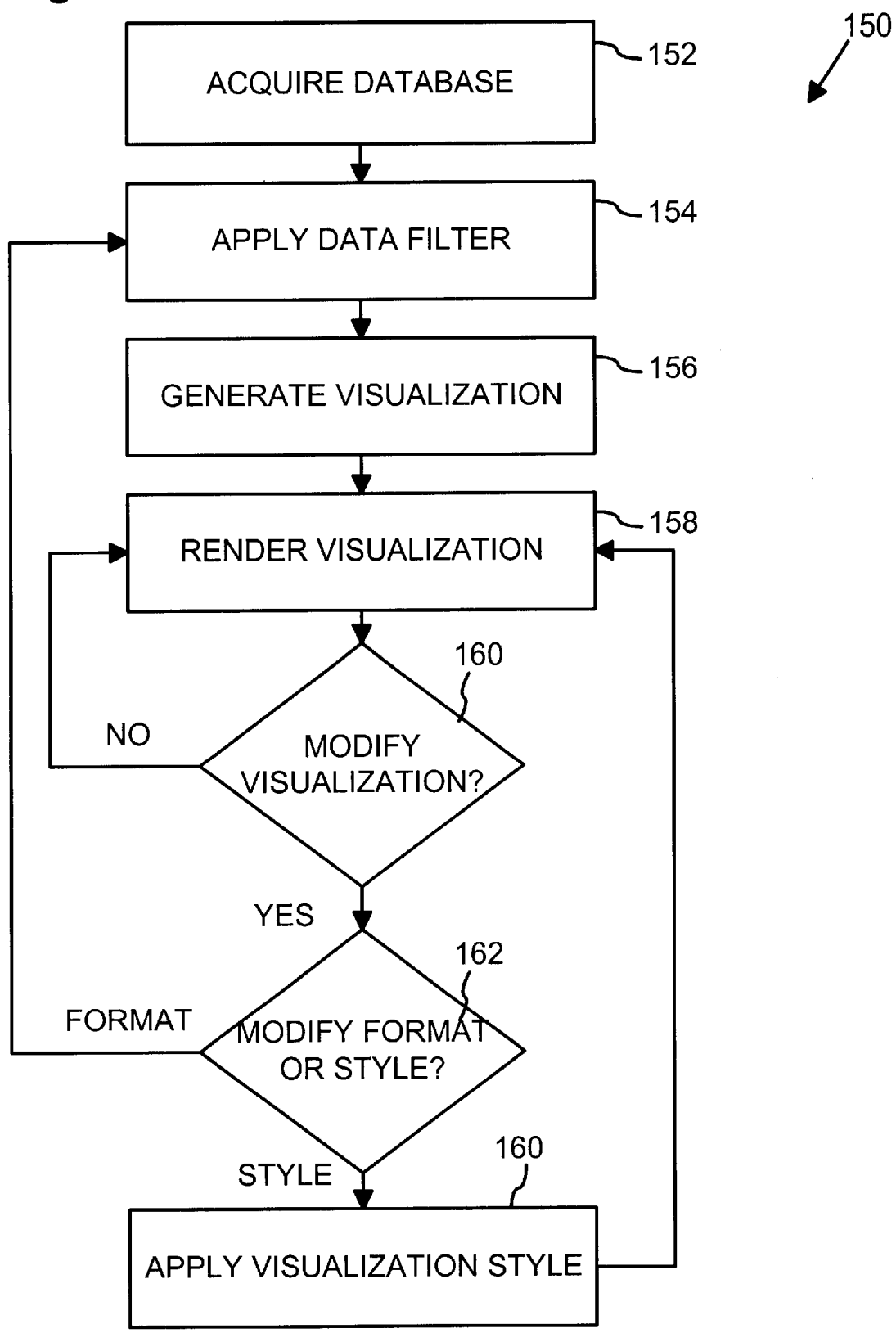

VISUALIZATIONS FOR COLLABORATIVE INFORMATION

Related Application

This application claims the benefit of the filing date of U.S. provisional application No. 60/100,420, filed Sep. 15, 1998.

FIELD OF THE INVENTION

The present invention relates to visualizations for interactive collaborative information and, in particular, to systems and methods for visualizing relationships in information relating to computer network interaction media.

BACKGROUND AND SUMMARY OF THE INVENTION

There are a wide variety of computer network interaction media, including email and email lists, conferencing systems and bulletin boards, chats, multi-user dungeons (MUDs), multi-user games and graphical virtual worlds. These network interaction media are used singly and in concert to create an increasing number of social cyberspaces that allow groups of people to gather on-line and interact with each other.

While network interaction media are becoming increasingly popular, there are a number of problems and difficulties facing the users of such media. The interaction context, or information, about the kind of space, group, and activity taking place in these media are frequently missing or ambiguous. This makes finding groups to participate in and people to interact with difficult. The history and structure of groups often become apparent only after extended participation. As a result, many of these media remain complex and confusingly tangled spaces in which it is difficult for users to navigate and participate.

One example of such an interaction medium or environment is Usenet, which is a collection of messages, referred to as posts, available through the Network News Transport Protocol (NNTP). The posts available through NNTP are organized into newsgroups that are named according to a hierarchical name convention. At the highest level are 15 or more general categories, such as rec, comp, alt, sci, etc., that identify the general subject (i.e., recreation, computer, alternative, science, etc.) of a set of newsgroups. Additional terms are added hierarchically to uniquely define a newsgroup within a collection of others (e.g., comp.lang.per.misc or rec.pets.misc.kids.pregnancy).

Many posts reference or reply to another post. As an organizational aid, posts that reference or reply to another post are nested or positioned directly under it to form a "thread." Threads are, organizational trees with an initial post at a top level and branches to all the responsive posts, which may themselves have branches as well. Some posts are copied or cross-posted to more than one newsgroup. A post with no responses or branches is sometimes called "barren."

Usenet is a widely available and widely used communication resource. As a consequence of this wide availability, at least some parts of Usenet suffer from over- or mis-use that can obscure or bury useful information in a newsgroup. For example, some newsgroups suffer from off-topic and poorly targeted messages, huge numbers of messages being posted, and limited tools for generating an overview of the messages in a newsgroup.

A common visualization format for a newsgroup is a vertical text listing of posts arranged generally according to the times they were posted. Threads are illustrated by positioning responsive posts in time sequence immediately under the original post in the thread. While suited for providing a linear listing of accurately titled post topics, this visualization format provides almost no contextual information about relationships between different posters, threads, or groups. In the face of off-topic and poorly targeted messages and large numbers of messages being posted, useful information can be lost or buried in such conventional visualizations.

The present invention provides improved visualizations of relationships or connections in collaborative information relating to network interaction media such as email and email lists, conferencing systems and bulletin boards, chats, multi-user dungeons (MUDs), multi-user games and graphical virtual worlds, etc. These improved visualizations are illustrated with reference to collaborative information relating to threaded message systems such as newsgroups.

In one implementation, network graphs in various display or visualization formats represent collaborative information relating to Usenet newsgroups. Network graphs present information as nodes that are connected together by links. These visualization formats are rendered on a display screen to provide a user with general information about the structure of a newsgroup by graphing relationships between newsgroups, between threads within a newsgroup, between people who post to newsgroups (i.e., posters), etc.

As examples, one visualization format provides an intergroup visualization in which newsgroup nodes are linked together by links representing messages that are cross-posted between the newsgroups. Another visualization format can provide an inter-thread visualization in which thread nodes are linked together by links representing shared posters. Yet another visualization format can provide a thread-to-poster visualization in which poster nodes are linked to threads to which the posters post messages. Still another visualization format can provide an inter-poster visualization in which poster nodes are linked together by shared threads.

The visualizations of relationships or connections in collaborative information relating to network interaction media may be provided by an interactive collaborative information visualization system that includes a database of collaborative information and a database filter to obtain and measure a user-selected portion of the collaborative information. A rendering engine renders a network graphical visualization of the selected portion of the collaborative information.

In one implementation, a graphical user interface allows a user to control the database filter to select the portion of the collaborative information to be obtained and measured. The user interface may include a control that allows the user to select from among multiple visualization formats, in which different formats collaboratively relate different selected portions of the collaborative information. The user interface may also, or alternatively, include a control that allows the user to select an appearance with which to render the network graphical visualization.

Additional objects and advantages of the present invention will be apparent from the detailed description of the preferred embodiment thereof, which proceeds with reference to the accompanying drawings.

BRIEF DESCRIPTION OF THE DRAWINGS

FIG. 8 is a flow diagram of a computer-controlled interactive collaborative information visualization process for visualizing collaborative information.

DETAILED DESCRIPTION OF PREFERRED EMBODIMENT

Figure 1:
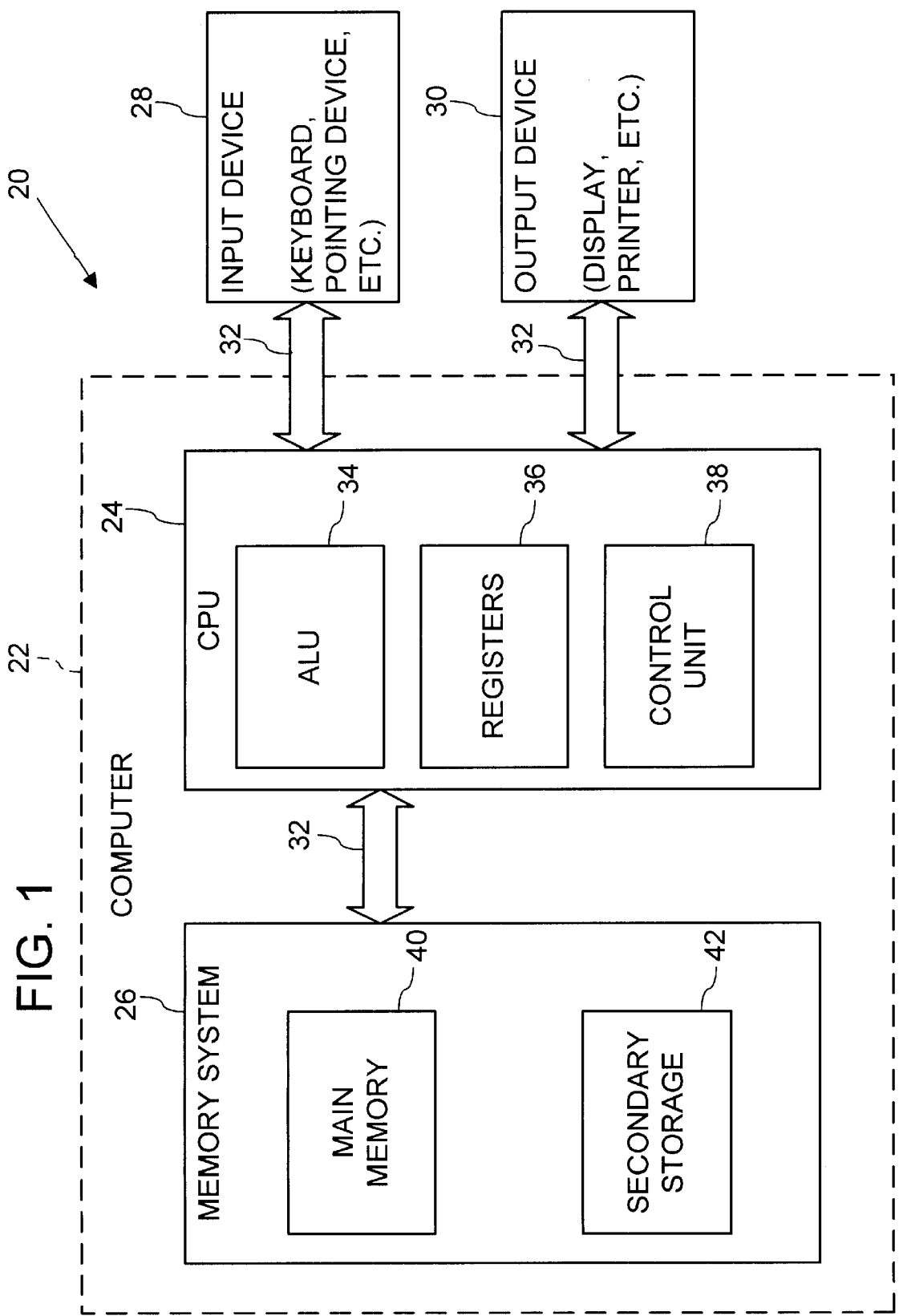
FIG. 1 is a block diagram of a computer system that may be used to implement the present invention.

FIG. 1 illustrates an operating environment for an embodiment of the present invention as a computer system 20 with a computer 22 that comprises at least one high speed processing unit (CPU) 24 in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPC from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28 and 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed and may be associated with the operating system or the application program as appropriate. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

Collaborative information is the product of connections or relationships between people and objects, in which the objects can be topics of discussion, database records, items (e.g., books) of interest, and other forms of data. With reference to books, for example, connections between people and books can be based upon who buys which books. Collaborative information can be rendered or displayed in an object-to-object visualization format that illustrates relationships between objects created by user activity, an objects-to-people visualization format that starts from objects and shows the people relating to the objects, a people-to-objects visualization format that starts from people and shows the objects that connect the people, or a people-to-people visualization format that shows how people relate to each other based upon their interests in similar objects.

While simple sets of relationships can be represented in tabular form, the relationships created in most collaborative information systems are better represented by network diagrams or graphs. Table 1 is a simplified example of collaborative information indicating the books that are selected or purchased by five different people.

TABLE 1

| PERSON | BOOKS PURCHASED |
| --- | --- |
| personA | book1, book2, book3 |
| personB | book1, book2, book3 |
| personC | book1, book4 |
| personD | book4, book5 |
| personE | book4, book5 |

Figure 2:
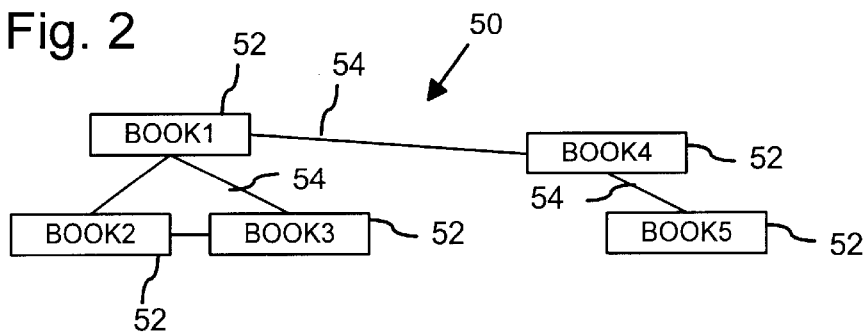
FIG. 2 illustrates a network graph in an object-to-object visualization format for representing collaborative information.

FIG. 2 illustrates a network graph in an object-to-object visualization format 50 for representing the collaborative information of Table 1. Object-to-object visualization format 50 includes object nodes 52 representing the books listed in Table 1 and links 54 that represent the frequency with which a single person purchases the linked books. The lengths of the lines representing links 54 correspond to the frequency, with shorter lines corresponding to stronger links and hence higher frequencies.

In this illustration, book1 and book2 are more closely related to each other than either is related to book5. Also, book1, book2, and book3 are connected to each other and so form a cluster, which could indicate that they relate to a common topic. Visualization format 50 can show how sets of books may be related to each other so that, for example, a user can use knowledge of one book to find related books or books on related topics.

Figure 3:
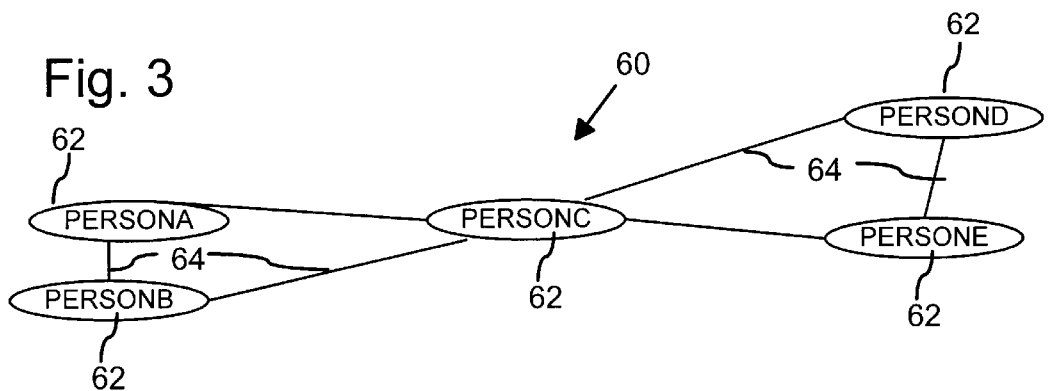
FIG. 3 illustrates a network graph in a people-to-people visualization format for representing collaborative information.

FIG. 3 illustrates a network graph in a people-to-people visualization format 60 for representing the collaborative information of Table 1. People-to-people visualization format 60 includes people nodes 62 representing the people listed in Table 1 and links 64 that represent the frequency with which the same book is purchased by the linked people. The lengths of the lines representing links 64 correspond to the frequency, with shorter lines corresponding to stronger links and hence higher frequencies.

In this illustration, personA and personB are most closely related to each other, and personC has the least in common among the listed people. Also, personA and personB are connected to each other and so form a cluster, as do personD and personE. This could indicate that those in the clusters have similar interests. Visualization format 60 can show how people might have common interests so that, for example, one could predict the books in which a person might be interested according selections by another with similar interests.

One implementation of the present invention provides visualizations of objects that involve computer network interaction media or environments created by the World Wide Web, Usenet newsgroups, email lists, and other computer network interaction media. Some interaction media, such as Usenet (NNTP) newsgroups and some World Wide Web (HTTP) sites, include threaded message posts that form what is sometimes called a bulletin board. The following description refers to Usenet newsgroups, but is similarly applicable to other computer-related interaction media.

Usenet is a collection of messages, referred to as posts, available through the Network News Transport Protocol (NNTP). The posts available through NNTP are organized into newsgroups that are named according to a hierarchical name convention. At the highest level are 15 or more general categories, such as rec, comp, alt, sci, etc., that identify the general subject (i.e., recreation, computer, alternative, science, etc.) of a set of newsgroups. Additional terms are added hierarchically to uniquely define a newsgroup within a collection of others (e.g., comp.lang.perl.misc or rec.pets.misc.kids.pregnancy).

Many posts reference or reply to another post. As an organizational aid, posts that reference or reply to another post are nested or positioned directly under it to form a "thread." Threads are organizational trees with an initial post at a top level and branches to all the responsive posts, which may themselves have branches as well. Some posts are copied or cross-posted to more than one newsgroup. A post with no responses or branches is sometimes called "barren."

FIGS. 4–7 are illustrations of network graphs in various display or visualization formats for representing exemplary collaborative information relating to Usenet newsgroups. These visualization formats are rendered on a display screen to provide a user with general information about the structure of a newsgroup by graphing relationships between newsgroups, between threads within a newsgroup, or between people (sometimes called posters) who post to newsgroups.

Figure 4:
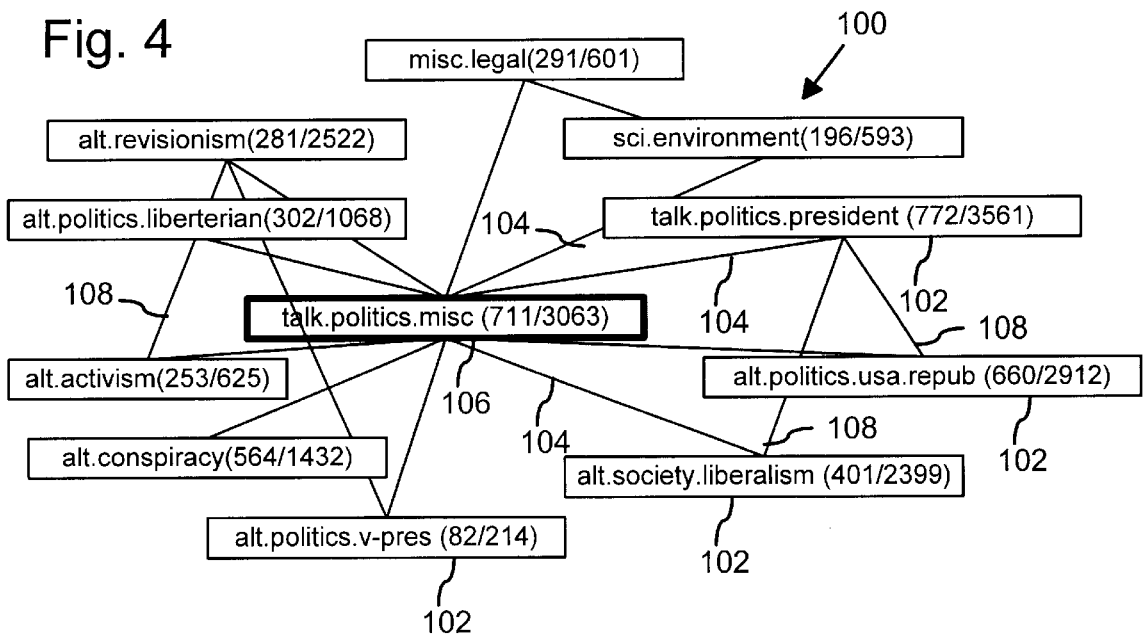
FIG. 4 is an illustration of a network graph representing an inter-group visualization format.

FIG. 4 is an illustration of a network graph representing an inter-group visualization format 100 that displays newsgroups 102 with links 104 to one or more (two shown) core newsgroups 106 that are, for example, selected by a user. Links 104 represent cross-posts between newsgroups 102 and core newsgroups 106. Inter-group visualization format 100 is an object-to-object diagram.

Optionally, cross-posts between the newsgroups 102 can also be represented by links 108. As another option, only cross-posts between the newsgroups 102 are represented by links 108 (i.e., no core groups 106 are designated). Selected newsgroups 106 are differentiated from newsgroups 102 by a contrasting display characteristic such as color (as shown), size, shape, display consistency, etc.

In one implementation, the relative number of cross-posts between a core newsgroup 106 and a newsgroup 102 corresponds to the relative strength of the link 104 between the two groups. The relative strengths of links 104 may be represented by their lengths, with shorter links 104 corresponding greater numbers of cross-posts. Strong links 104 that correspond to relatively large numbers of cross-posts between groups may indicate similarities in the subject matter or topics covered by the two groups. Accordingly, inter-group visualization format 100 may be used as an indicator of the commonality in the subject matter of different newsgroups. A user familiar with the subject matter of a selected newsgroup 106 could identify from inter-group visualization format 100 other newsgroups 102 that might have related information or subject matter.

Figure 5:
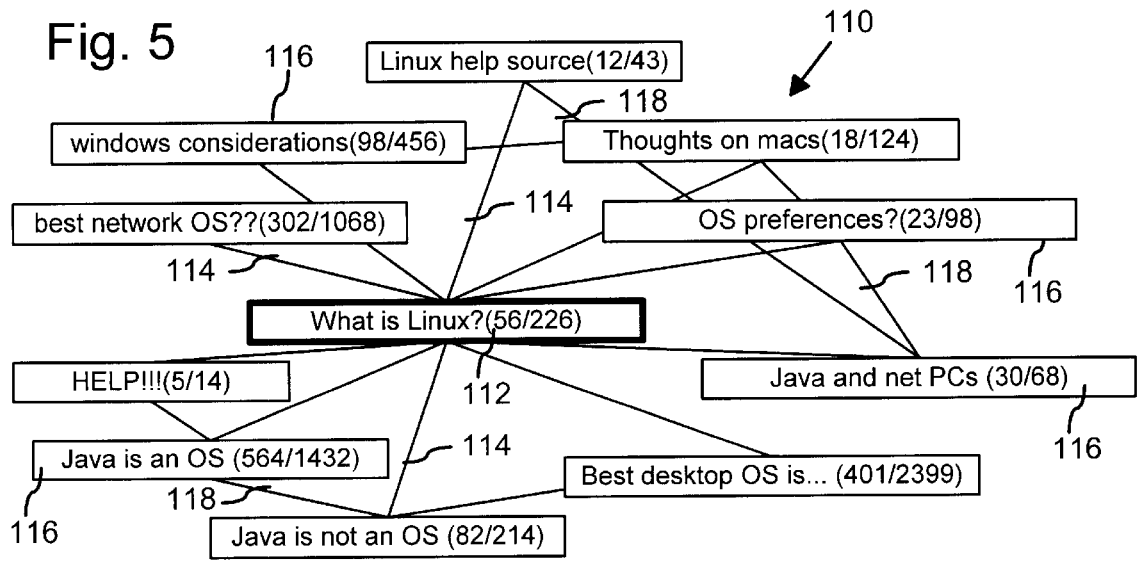
FIG. 5 is an illustration of a network graph representing an inter-thread visualization format.

FIG. 5 is an illustration of a network graph representing an inter-thread visualization format 110 that displays for a particular newsgroup links 114 between selected or core threads 112 and other threads 116. Links 114 represent the numbers of posters who post messages to the linked threads 112 and 116. Inter-thread visualization format 110 also is an object-to-object diagram.

Optionally, posters common to threads 112 can also be represented by links 118. As another option, only posters common to threads 112 are represented by links 118 (i.e., no core threads 116 are designated). Core threads 112 are differentiated from threads 116 by a contrasting display characteristic such as color (as shown), size, shape, display consistency, etc.

In one implementation, the relative number of common posters to a core newsgroup 112 and a thread 116 corresponds to the relative strength of the link 114 between the two threads. Strong links 114 corresponding to relatively large numbers of common posters in two threads may indicate threads that generate significant interest or response in the newsgroup. Threads that do not share posters with other threads are isolated and could represent topics that do not generate significant interest in the group. Accordingly, inter-thread visualization format 110 may be used as an indicator of the level of interest or discussion within a thread.

Figure 6:
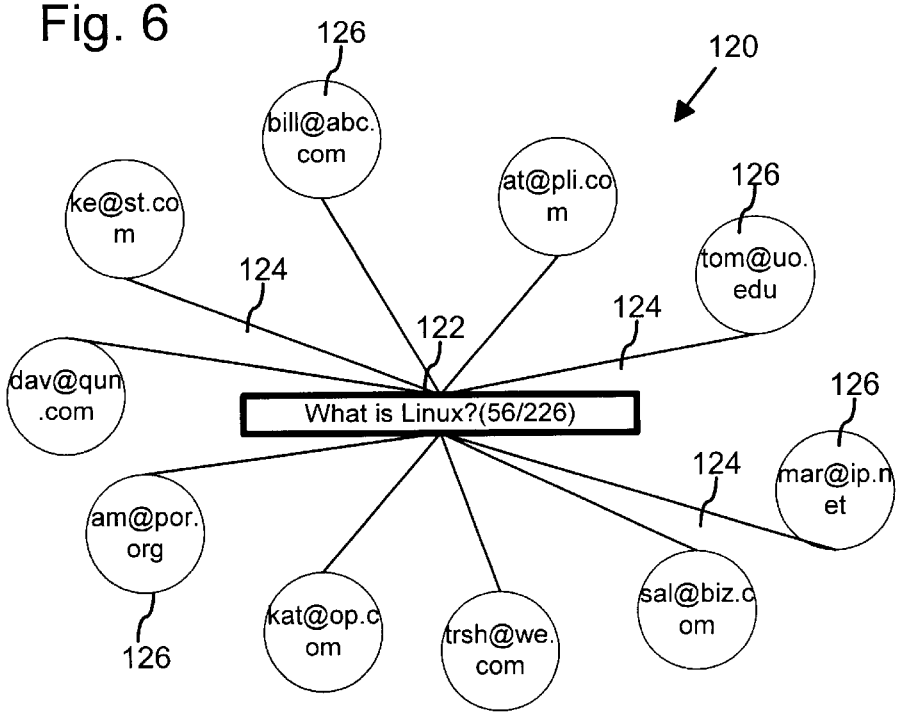
FIG. 6 is an illustration of a network graph representing a thread-to-poster visualization format.

FIG. 6 is an illustration of a network graph representing a thread-to-poster visualization format 120 that displays within a particular newsgroup links 124 between selected or core threads 122 and posters 126 who contribute to the threads. Links 124 function to cluster posters 126 around threads 122 to which the posters contribute. In this implementation, links 124 do not have relative strengths. Core threads 122 are differentiated from posters 126 by a contrasting display characteristic such as color (as shown), size, shape (as shown), display consistency, etc. Thread-to-poster visualization format 120 is an object-to-person diagram by which a user could begin to find other users with similar interests.

Figure 7:
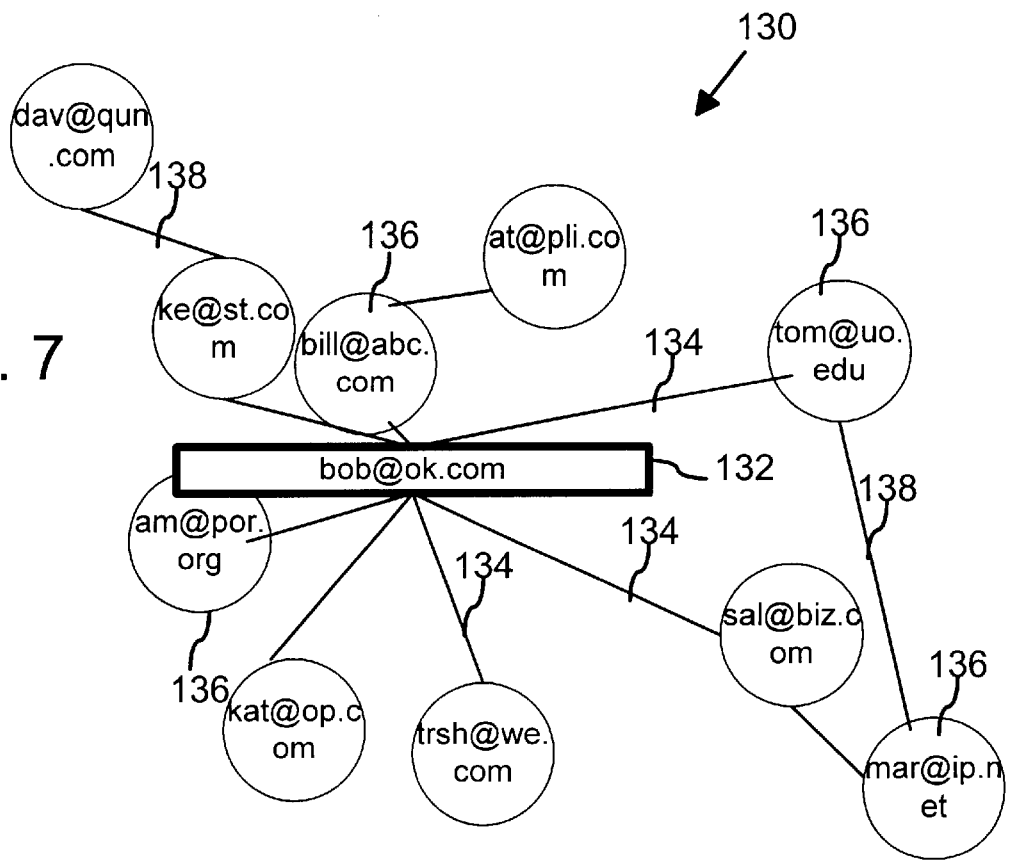
FIG. 7 is an illustration of a network graph representing an inter-poster visualization format.

FIG. 7 is an illustration of a network graph representing an inter-poster visualization format 130 that displays within a particular newsgroup links 134 between selected or core posters 132 and other posters 136. Links 134 represent the number of threads shared by the linked posters 132 and 136. Inter-poster visualization format 130 is a person-to-person diagram.

Optionally, threads shared by posters 136 can also be represented by links 138. As another option, only threads common to posters 136 are represented by links 138 (i.e., no core threads 132 are designated). Core posters 132 are differentiated from posters 136 by a contrasting display characteristic such as color (as shown), size, shape, display consistency, etc.

In one implementation, the relative number of common threads between a core poster 132 and a poster 136 corresponds to the relative strength of the link 134 between them. Strong links 134 corresponding to relatively large numbers of common threads between two posters may indicate posters contribute to the newsgroup frequently and hence are core members of the group. Some posters post infrequently, but are responded to by many others. Other posters may post frequently, but receive few or no responses. Accordingly, inter-poster visualization format 130 may be used as an indicator of the amount and type of interaction within the group, as well as the status and behavior of individual participants.

A newsgroup post or message includes a header and a body. The body is the text information or file attachment in the post. The header includes routing, categorization, and authorship information regarding the post. As examples, the header may include the email address and name of the poster, the organization with which the poster is associated, the subject of the post, a unique identification number for identifying the post, a list of the other posts referenced by the post, a date, time, and time zone indicator for the post, the number of lines in the body of the post, and a list of other newsgroups to which the posts is cross-posted. The header may also include followups, xrefs, xheader, and newreader lines.

FIG. 8 is a flow diagram of a computer-controlled interactive collaborative information visualization process 150 for visualizing collaborative information, such as information relating to network interaction media such as, for example, information relating to Usenet newsgroups. Collaborative information visualization process 150 could be applied similarly to other collaborative information such as email and email lists, conferencing systems and bulletin boards, chats, multi-user dungeons (MUDs), multi-user games and graphical virtual worlds, etc.

Process block 152 indicates that a database is acquired for the collaborative information. In one implementation the database is a relational database. With reference to obtaining information relating to a selected set of Usenet newsgroups, for example, information is obtained from the header of each posting in the selected set of newsgroups. The selected set of newsgroups could include all newsgroups or any sub-set of newsgroups, such as all the newsgroups within a top Usenet level, such as comp, sci, or rec, or at any other level.

In one implementation, information is obtained from the following fields in the header of each posting: From, Newsgroups, Subject, Date, Organization, Lines, Message-ID, and References. The From field identifies the poster and may include his email address and name. The Newsgroups field includes the names of other groups to which the post is cross-posted. The Subject field states the topic or title of the post. The Date field includes the time, date, and time zone of the post. The Organization includes the organization with which the poster is associated. The Lines field includes the number of lines of text in the post body. The Message-ID is a unique identifier for the post.

Process block 154 indicates that the database is data-filtered to extract selected information. With reference to inter-group visualization 100 of FIG. 3, for example, the cross-postings between newsgroups are identified from the Newsgroups fields of the posts in the database and the number of cross-postings between each pair of newsgroups is measured or tallied. This data filtering process provides a filtered set of collaborative information.

Process block 156 indicates that a visualization is generated according based upon the filtered set of collaborative information. The visualization is generated according to a selected visualization format and a selected visualization style. With reference to collaborative information relating to Usenet newsgroups, for example, the selected visualization format could be any of formats 100, 110, 120, or 130, or any other format illustrating collaborative relationships between the objects or people included in the database. The selected visualization style defines how the selected visualization format is rendered and is described below in greater detail.

Process block 158 indicates that the visualization is rendered on a display screen according to selected visualization style components.

Query block 160 represents an inquiry as to whether a modification of the visualization is selected, such as by a user. Query block 160 proceeds to query block 162 whenever a modification of the visualization is selected and otherwise returns to process block 158.

Query block 162 represents an inquiry as to whether the selected modification modifies the visualization format or the visualization style. Query block 162 returns to process block 154 whenever a modification of the visualization format is selected. Query block 162 proceeds to process block 164 whenever a modification of the visualization style is selected.

Process block 164 indicates that a visualization style modification is applied to the visualization, as described below in greater detail. Process block 164 returns to process block 158.

Figure 9:
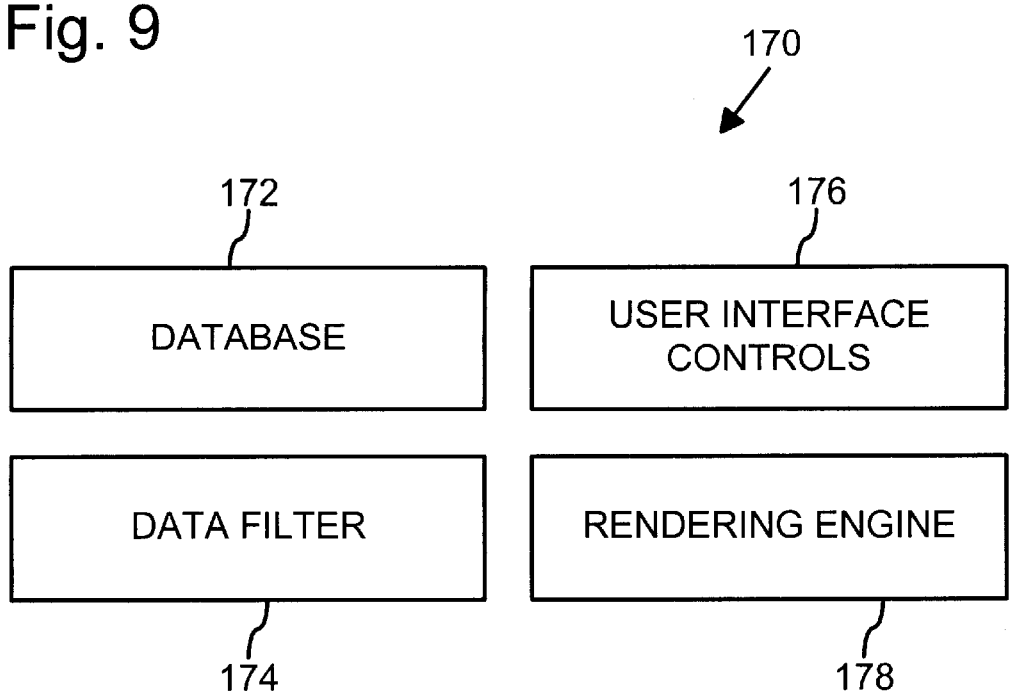
FIG. 9 is a block diagram of an interactive collaborative information visualization software system operable within a computer-readable medium according to the visualization process of FIG. 7.

FIG. 9 is a block diagram of an interactive collaborative information visualization software system 170 operable within a computer-readable medium according to visualization process 150. Visualization system 170 includes a database 172 (e.g., a relational database) of collaborative information. A database filter 174 filters database 172 according to filter parameters or queries specified by a user. Database filter 174 may function as a generally conventional relational database filter.

Graphical user interface controls 176 are rendered on a display screen and allow a user to select modifications of the visualization format and the visualization style, as described below in greater detail. Generally, visualization format selections are used to control database filter 174, and visualization style selections are used to control the appearance of the visualization. A rendering engine 178 renders a network graphical visualization according to results obtained by database filter 174 and visualization style selections made with user interface controls 176.

Figure 10:
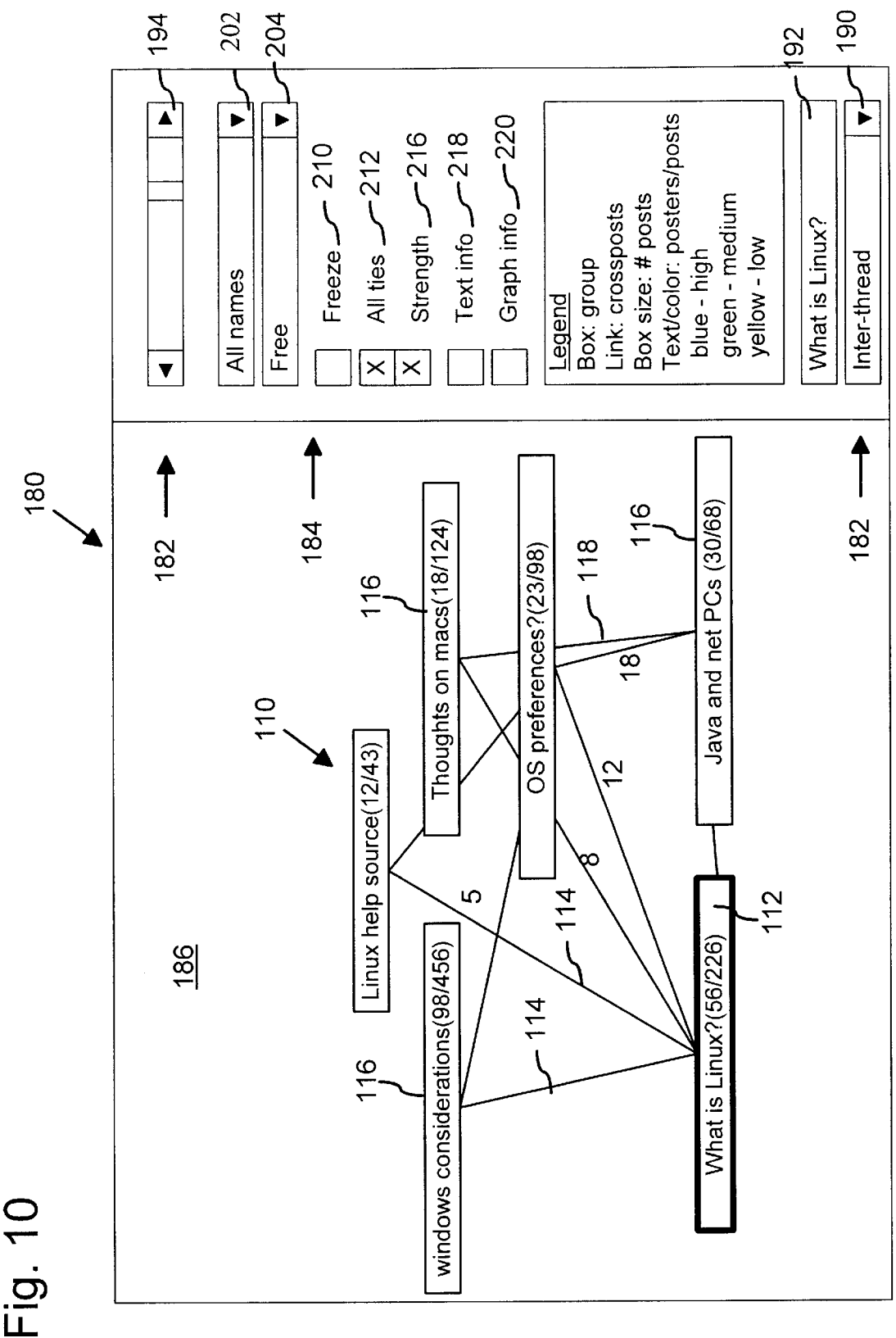
FIG. 10 is an illustration of one implementation of a graphical user interface by which a user can select modifications to a visualization format and a visualization style.

FIG. 10 is an illustration of one implementation of a graphical user interface 180 as rendered on a display screen and by which a user can select modifications of the visualization format and the visualization style. User interface 180 includes visualization format controls 182, visualization style controls 184, and a visualization window 186 within which the selected visualization is rendered. User interface 180 is illustrated with controls 182 and 184 arranged in a vertical orientation, but may alternatively employ a horizontal orientation, such as with controls 182 and 184 arranged across the bottom of a display screen.

Visualization format controls 182 include a drop-down menu 190 for selecting a visualization format (e.g., inter-group visualization format 100, inter-thread visualization format 110, thread-to-poster visualization format 120, inter-poster visualization format 130, or others). In the illustration of FIG. 10, inter-thread visualization format 110 is selected in drop-down menu 190 and rendered in visualization window 186. Visualization format controls 182 may optionally include a core node window 192 that in the illustration of FIG. 10 lists by name the core nodes (e.g., core threads 112), which may also distinguished by color, shape, or both in visualization window 186.

The strengths of the links between nodes in the visualization, such as links 114 between core threads 112 and other threads 116 in FIG. 10, may be indicated by the relative lengths of the links. The strengths may be determined according to a number models or criteria. As one example, links 114, as well as the links in other visualization formats, may be based-upon a spring-based model, as is known in the art. In a spring-based model, each node (i.e., object or person) exerts a repelling force on other nodes, and each link exerts an attracting force on the nodes it connects. The attracting force corresponds to the strength of the connection between the two nodes. In the illustration of FIG. 10, for example, the strength of a link 114 corresponds to the number of posters who post messages to the linked groups. The resulting separation between a pair of linked nodes corresponds to the strength of the link.

Visualization format controls 182 also include a link strength filter control slider 194 for selectively filtering the visualization according to the strengths of links between the nodes (e.g., newsgroups 112 and 116 in FIG. 10). With link strength filter control slider 194 at one end of its range (e.g., at its left-most position), the visualization has no link strength filtering applied and all nodes linked to the core node in the visualization are rendered. Link strength filter control slider 194 allows a user to remove from the visualization the nodes (e.g., groups) that are connected by weaker links to better see the significant connections in the visualization.

Figure 11:
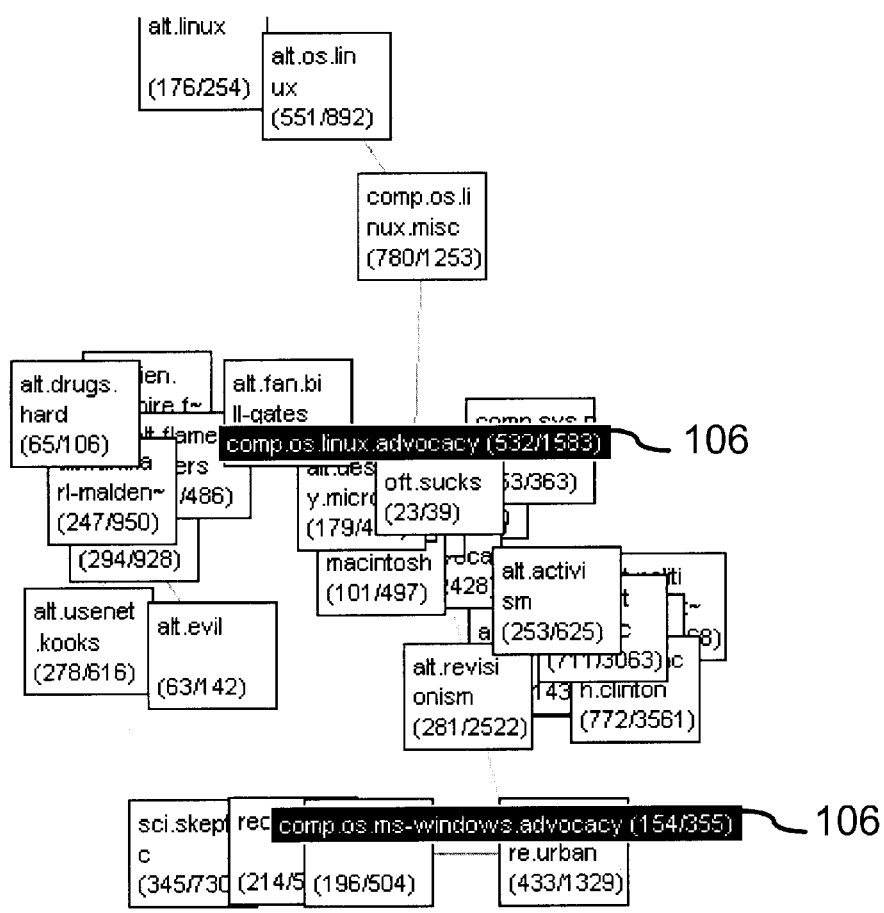
FIG. 11 illustrates an exemplary visualization of a large number of newsgroup nodes that are connected to two exemplary core nodes.
Figure 12:
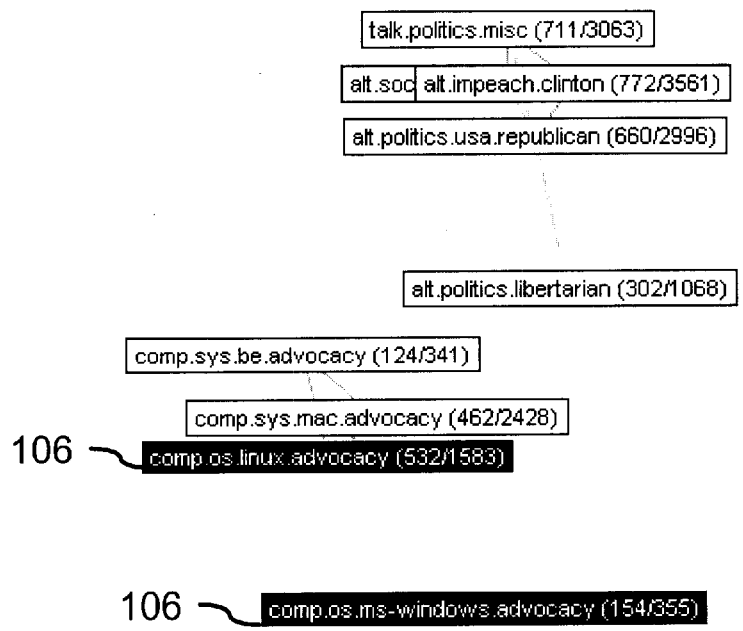
FIG. 12 illustrates an exemplary visualization of fewer of newsgroup nodes than are illustrated in FIG. 10.

FIG. 11 illustrates a visualization of newsgroup nodes that are connected to two exemplary core nodes 106. This number of linked nodes in this visualization can obscure information about the ways the nodes are linked together. FIG. 12 illustrates a visualization of fewer ones of the newsgroup nodes illustrated in FIG. 11. These fewer nodes are obtained by selecting (e.g., with filter control slider 194) a link strength filter to remove nodes with weaker links. Additional re-positioning of link strength filter control slider 194 toward the right would eliminate nodes with successively weaker links. It will be appreciated that the name style of the nodes of FIG. 12 also differs from that of FIG. 11, as described below.

In one implementation, changes in link strength filter control slider 194 apply varying link strength filters to the visualization nodes initially obtained for the selected group (e.g., the original core newsgroups 106 for which the visualization was rendered). In an alternative implementation, changes in link strength filter control slider 194 could apply varying link strength filters to all the nodes in the original core newsgroups 106. The difference in these implementations is that in the former filtering at successively higher strengths can provide different groups of nodes in which nodes within a group are linked together, but with no links between nodes in the different groups. In the latter implementation, filtering at successively higher strengths would not provide such different groups of nodes.

With reference to FIG. 10, visualization style controls 184 include a drop-down node name menu 202 and a drop-down core node position menu 204. Node name menu 202 may include options to display nodes with "all names," "long names," or "no names." The "all name" node style displays node names with up to a fixed number of text characters (e.g., 20), which causes longer names to be truncated. The nodes in this style may be formed, for example, to accommodate a single line of text with the limited number of characters.

Figure 13:
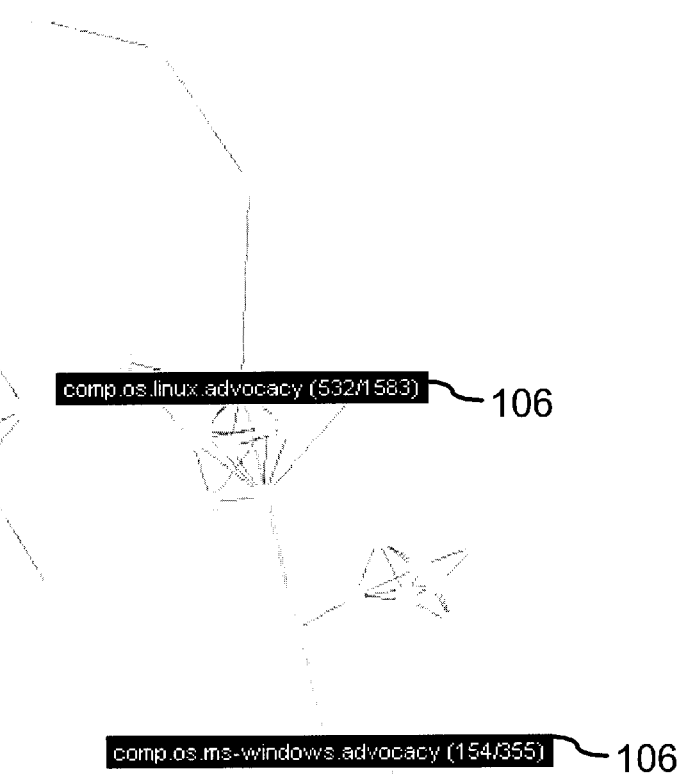
FIG. 13 illustrates the exemplary visualization of FIG. 11 in a "no names" style.

The "long name" node style displays the full names of the nodes and so the nodes may be formed to accommodate multiple text lines, as shown in FIG. 11. With reference to FIG. 13, the "no name" node style displays nodes other than the core nodes as boxes without the names of the nodes or any other text indications. This style allows the boxes for the nodes to be much smaller, thereby allowing a user to discern relationships among larger numbers of nodes.

Core node position menu 204 may include options to display the nodes (e.g., nodes 112) in "fixed," "free," or "weighted positions." With the fixed position selection, a user may manually position nodes (e.g., to clarify the links between them). Nodes are arranged automatically, such as by a spring-based model, in the free and weighted styles. With the free position selection, nodes float in relation to each other according to the relative strengths of the links and the spacing between nodes provided by the model. With the weighted position selection, nodes float at a vertical position according to the number of other nodes are linked to it. The weighted position selection can identify nodes that have greater numbers of links and, hence, are likely more central among the set of nodes.

Visualization style controls 184 also include a freeze check-box 210, an all ties check-box 212, a strength check-box 216, a text info check box 218 and a graph info check-box 220. Freeze check-box 210 allows a user to selectively lock or "freeze" (when checked) the positions of the nodes in the visualization. A freeze style visualization can eliminate jitter in the positioning of nodes that can be caused optimal layouts are automatically sought for free-positioned nodes. The freeze style can also allow a user to manually reposition nodes (e.g., by selecting and dragging them into position) so as to better discern selected aspects of the visualization. All ties check-box 212 allows a user to selectively show (when checked) links between all nodes in the visualization, as shown in FIG. 10. The default (unchecked) style shows links 114 between selected groups 112 and the other groups 116, but not links 118.

Strength check-box 216 allows a user to selectively show (when checked) numeric values corresponding to the strengths of the links (e.g., the numbers of cross-posts between linked groups) as shown in FIG. 10. The default (unchecked) style represents the strengths only graphically by the lengths of the links. Text info check box 218 allows a user to selectively show (when checked), in addition to the node name, other text information about the node (e.g., the numbers of posters and posts) as shown in FIG. 10. Graph info check-box 220 allows a user to selectively render each node (when checked) with graphical characteristics corresponding to characteristics of the node (e.g., size of node box corresponds to number of posts in the group and the color of the box corresponds to the ratio of posters to posts) as indicated in the Legend section of FIG. 10.

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

What is claimed is:

1. In a computer readable medium, an interactive collaborative information visualization system, comprising:
    a database of threaded message information relating to a computer-based threaded message environment;
    a database filter to obtain and measure a selected portion of the threaded message information;
    user interface controls by which a user controls the database filter to select the selected portion of the threaded message information to be obtained and measured; and
    a rendering engine to render a network graphical visualization of the selected portion of the threaded message information.

2. The system of claim 1 in which the user interface controls include a visualization format control to select from among plural visualization formats, in which different formats relate different selected portions of the threaded message information.

3. The system of claim 1 in which the user interface controls include plural visualization style controls to provide an appearance with which to render the network graphical visualization of the selected portion of the threaded message information.

4. The system of claim 3 in which the user interface controls include a control to select from among plural visualization formats, in which different formats relate different selected portions of the threaded message information.

5. The system of claim 4 in which the threaded message environment includes groups of messages that are posted in threads by posters.

6. The system of claim 5 in which one of the visualization formats provides an inter-group visualization in which groups are linked together by cross-posted messages.

7. The system of claim 5 in which one of the visualization formats provides an inter-thread visualization in which threads are linked together by shared posters.

8. The system of claim 5 in which one of the visualization formats provides a thread-to-poster visualization in which posters are linked to threads to which the posters post messages.

9. The system of claim 5 in which one of the visualization formats provides an inter-poster visualization in which posters are linked together by shared threads.

10. In an interactive collaborative information visualization system that provides a network graphical visualization of threaded message information, a graphical user interface rendered on a display screen, comprising:
    a visualization format control to select from among plural visualization formats, in which different formats collaboratively relate different selected portions of the threaded message information; and
    plural visualization style controls to provide an appearance with which to render the network graphical visualization of the selected portion of the threaded message information.

11. The interface of claim 10 in which the threaded message information relates to a computer-related interaction medium.

12. The interface of claim 10 in which one of the visualization formats provides an object-to-object visualization of the threaded message information.

13. The interface of claim 10 in which one of the visualization formats provides an object-to-person visualization of the threaded message information.

14. The interface of claim 10 in which one of the visualization formats provides a person-to-person visualization of the threaded message information.

15. The interface of claim 10 in which the network graphical visualization of the threaded message information includes links of varying strengths between nodes of the information and the visualization format control includes a strength filter control for controlling which nodes are included in the visualization according to the strengths of the links to those nodes.

16. The interface of claim 15 in which the visualization style controls include a control for selectively displaying numeric values for the strengths of the links.

17. The interface of claim 10 in which the visualization style controls include a control for selectively displaying only links from core nodes to other nodes in the visualization.

18. The interface of claim 17 In which the visualization style controls include a control for selectively displaying all links between the nodes in the visualization.

19. The interface of claim 10 in which the visualization style controls include a control for selectively displaying nodes with graphical characteristics corresponding to information associated with the nodes.

20. The interface of claim 10 in which the visualization style controls selectively allow a user to position nodes in the visualization.

21. The interface of claim 10 in which the visualization style controls include a control for displaying nodes with different text information.

22. The interface of claim 10 in which the threaded message information relates to a threaded message environment in which groups of messages are posted in threads by posters.

23. The interface of claim 22 in which one of the visualization formats provides an inter-group visualization in which groups are linked together by cross-posted messages.

24. The interface of claim 22 in which one of the visualization formats provides an inter-thread visualization in which threads are linked together by shared posters.

25. The interface of claim 22 in which one of the visualization formats provides a thread-to-poster visualization in which posters are linked to threads to which the posters posts messages.

26. The interface of claim 22 in which one of the visualization formats provides an inter-poster visualization in which posters are linked together by shared threads.

27. An interactive threaded message information visualization method, comprising:

forming a database of threaded message information relating to a computer-based threaded message environment;

applying a database filter to the database to obtain and measure a selected portion of the threaded message information;

providing user interface controls by which a user controls the database filter to select the selected portion of the threaded message information to be obtained and measure; and rendering a network graphical visualization of the selected portion of the threaded message information.

28. The method of claim 27 in which the user interface controls include a control to select from among plural visualization formats, in which different formats relate different selected portions of the threaded message information.

29. The method of claim 28 in which the threaded message environment includes groups of messages that are posted in threads by posters and in which one of the visualization formats provides an inter-group visualization in which groups are linked together by cross-posted messages.

30. The method of claim 28 in which the threaded message environment includes groups of messages that are posted in threads by posters and in which one of the visualization formats provides an inter-thread visualization in which threads are linked together by shared posters.

31. The method of claim 28 in which the threaded message environment includes groups of messages that are posted in threads by posters and in which one of the visualization formats provides a thread-to-poster visualization in which posters are linked to threads to which the posters post messages.

32. The method of claim 28 in which the threaded message environment includes groups of messages that are posted in threads by posters and in which one of the visualization formats provides an inter-poster visualization in which posters are linked together by shared threads.

* * * * *